(12) United States Patent
Lazur et al.

(10) Patent No.: US 9,328,620 B2
(45) Date of Patent: May 3, 2016

(54) METHOD FOR MAKING GAS TURBINE ENGINE COMPOSITE STRUCTURE

(71) Applicant: Rolls-Royce Corporation, Indianapolis, IN (US)

(72) Inventors: Andrew Joseph Lazur, Huntington Beach, CA (US); Adam Lee Chamberlain, Mooresville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 217 days.

(21) Appl. No.: 14/141,956

(22) Filed: Dec. 27, 2013

(65) Prior Publication Data

US 2014/0261986 A1    Sep. 18, 2014

Related U.S. Application Data

(60) Provisional application No. 61/780,952, filed on Mar. 13, 2013.

(51) Int. Cl.
| | |
|---|---|
| *C04B 35/00* | (2006.01) |
| *B29C 33/52* | (2006.01) |
| *F01D 5/28* | (2006.01) |
| *C04B 35/571* | (2006.01) |
| *C04B 35/573* | (2006.01) |
| *C04B 35/80* | (2006.01) |
| *C04B 37/02* | (2006.01) |
| *B28B 1/42* | (2006.01) |
| *B28B 21/48* | (2006.01) |
| *C04B 35/565* | (2006.01) |
| *F16D 69/02* | (2006.01) |
| *B22F 5/10* | (2006.01) |
| *C22C 1/04* | (2006.01) |

(52) U.S. Cl.
CPC . *F01D 5/282* (2013.01); *B28B 1/42* (2013.01); *B28B 21/48* (2013.01); *C04B 35/571* (2013.01); *C04B 35/573* (2013.01); *C04B 35/803* (2013.01); *C04B 35/806* (2013.01); *C04B 37/023* (2013.01); *B22F 2005/103* (2013.01); *B22F 2999/00* (2013.01); *B29C 33/52* (2013.01); *C04B 35/565* (2013.01); *C04B 2235/5244* (2013.01); *C04B 2235/5248* (2013.01); *C04B 2235/6028* (2013.01); *C04B 2235/614* (2013.01); *C04B 2235/616* (2013.01); *C04B 2237/30* (2013.01); *C04B 2237/363* (2013.01); *C04B 2237/38* (2013.01); *C04B 2237/40* (2013.01); *C04B 2237/402* (2013.01); *C04B 2237/404* (2013.01); *C04B 2237/405* (2013.01); *C22C 1/04* (2013.01); *C22C 1/0416* (2013.01); *F01D 5/284* (2013.01); *F05D 2300/6033* (2013.01); *F16D 69/023* (2013.01); *F16D 2200/0052* (2013.01); *Y10T 156/1028* (2015.01)

(58) Field of Classification Search
CPC .. B29C 53/824; B29C 33/0016; B29C 33/52; B29C 2043/3668; C04B 35/565; C04B 35/573; C04B 35/575; F16D 65/12; F16D 69/023; F16D 2200/0052
USPC ......................................................... 156/173
See application file for complete search history.

(56) References Cited

U.S. PATENT DOCUMENTS

| | | | |
|---|---|---|---|
| 2002/0151428 A1* | 10/2002 | Horiuchi et al. ................ | 501/88 |
| 2003/0118757 A1* | 6/2003 | Bauer et al. .................. | 428/34.1 |

FOREIGN PATENT DOCUMENTS

| | | |
|---|---|---|
| JP | H05-148025 A | 6/1993 |
| JP | H06-077310 A | 3/1994 |
| JP | H07-117026 A | 5/1995 |

OTHER PUBLICATIONS

International Search Report and Written Opinion, mailed Oct. 7, 2014 for International Application No. PCT/US2013/078210, filed Dec. 30, 2013.

* cited by examiner

*Primary Examiner* — Carson Gross
(74) *Attorney, Agent, or Firm* — Brinks Gilson & Lione

(57) ABSTRACT

A method for making a gas turbine engine matrix composite structure. The method includes providing at least one metal core element, fabricating a matrix composite component about the metal core element, and removing at least part of the metal core element from the matrix composite component by introduction of a halogen gas.

19 Claims, No Drawings

METHOD FOR MAKING GAS TURBINE ENGINE COMPOSITE STRUCTURE

CROSS-REFERENCE TO RELATED APPLICATIONS

This application claims priority to U.S. Provisional Application Ser. No. 61/780,952, entitled "Method for Making Gas Turbine Engine Composite Structure," filed Mar. 13, 2013, which is hereby incorporated by reference in its entirety.

TECHNICAL FIELD

The present application relates to methods for making gas turbine engine composite matrix structures, and more particularly, but not exclusively, to methods for incorporating and removing a metal core during manufacture of the composite matrix structure.

BACKGROUND

Gas turbine engine composite matrix structures and the manufacture of such composite matrix structures, particularly in gas turbine engine applications such as blades, vanes, blade tracks, and combustor lines, remain an area of interest. Some existing systems and methods have various shortcomings, drawbacks, and disadvantages relative to certain applications. Accordingly, there remains a need for further contributions in this area of technology.

SUMMARY

One embodiment of the present application is a unique method of manufacturing a composite matrix structure which includes using a metal core during the manufacture of the composite matrix structure, and a halogen gas to later remove the metal core. Other embodiments include unique methods, systems, devices, and apparatus to provide for aligning a lock chassis to an orientation and retaining an anti-rotation plate to the lock chassis. Further embodiments, forms, objects, aspects, benefits, features, and advantages of the present application shall become apparent from the description and figures provided herewith.

DETAILED DESCRIPTION OF REPRESENTATIVE EMBODIMENTS

While the present invention can take many different forms, for the purpose of promoting an understanding of the principles of the invention, reference will now be made to embodiments and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

A method for making a gas turbine engine matrix composite pressure turbine blade, or airfoil, according to an embodiment will now be described. Although the embodiment is described with respect to a method for making a matrix composite turbine blade; other configurations are also contemplated. The matrix composite structure can comprise, for example, any hot section component(s) of the gas turbine engine, including blades, vanes, blade tracks, and combustor liners. More generally, the matrix composite structure can comprise any component required to operate in a high temperature environment. As will be described herein with respect to one or more embodiments in greater detail below, various cooling, materials, and coatings can be used in the matrix composite structure and its method of manufacture to provide high temperature mechanical, physical and chemical properties. Further, the matrix composite structure and its method of manufacture can comprise a complex geometry and/or complex internal shape, such as the aforementioned hot section components of gas turbine engines.

The method includes manufacturing a core made of Ge55/Si45 alloy using for example a sintered powdered process. The method can be used for reducing the weight of the blade and/or increasing blade stiffness, for example. The blade can be cooled or uncooled. The core can be formed to have a shape that corresponds substantially to that of the blade's hollow. A plurality of plies, for example four plies, of a ceramic fabric are then wrapped around the core. In one form, the ceramic fabric comprises, for example, HI-NICALON ceramic fabric. The ceramic fabric extends beyond the tool in the blade's span direction on both sides of the blade. The top portion of the ceramic fabric can be shaped as a solid portion of the blade. The lower portion of the ceramic fabric can be integrated with additional ceramic fabric to create a blade attachment and platform structure. The core can include an extension from the lower portion of the cavity that extends through the blade's dovetail.

The core and ceramic fabric combination, or part, is then tooled externally using for example a graphite tool for boron nitride fiber coating by chemical vapor infiltration (CVI). An element can be provided on the end of the core to engage the external tools for alignment. The part can additionally be infiltrated with SiC CVI. The external tooling is then removed. The part can then be heated in a vacuum furnace with the part supported so the dovetail is down. The core becomes molten and flows out from the lower portion of the part with the exception of some residual core material. The temperature can then be increased to about 1450 degrees Celsius and chlorine gas can be introduced to remove the residual core material. The reaction of the core material with the chlorine gas can be based on, for example, the core material, the temperature, pressure, etc. As a result of the reaction, the core material is removed from the part. The part can be infiltrated with a slurry and then melt infiltrated with silicon at a temperature greater than 1410 degrees Celsius. The part can then be machined and coated with an environmental barrier coating (EBC).

A method for making an actively cooled CMC intermediate pressure turbine blade according to an embodiment will now be described. The method can be used for reducing weight and/or increasing airfoil stiffness. The method includes manufacturing a plurality, for example four, tapered cores using Al52/Si48 castings. During the casting process the carbon release film can be converted on the surface to SiC. An additional layer of carbon can be applied to the castings so that initial CVI processing does not significantly remove mandrel material. In addition, chopped fiber with binder can be used to fill in branched areas of the castings that are unable to be wrapped with ceramic fabric. The castings and filler material can each be wrapped with a plurality of plies, for example two plies, of a ceramic fabric and assembled into a parallel array. In one form, the ceramic fabric comprises, for example, HI-NICALON ceramic fabric. The array can be held in a tool and laminated with additional layers, for example six layers, of span biased ceramic fabric such as HI-NICALON. The cores can stop for example at three-fourths (¾) span and can extend to the bottom of the dovetail.

Extra layers of ceramic fabric can be laminated in the attachment area. A platform can be added to the preform using for example the HI-NICALON fabric.

The multi-core and ceramic fabric part is then tooled externally using for example a graphite tool for boron nitride fiber coating by CVI. An element can be provided on the end of each core to engage the external tools for alignment. The part can additionally be infiltrated with SiC CVI. The external tooling is then removed. The part can then be heated in a vacuum furnace with the part supported so the dovetail is down. The cores become molten and flow out from the lower portion of the part with the exception of some residual core material. The temperature is increased to about 1450 degrees Celsius and chlorine gas is introduced to remove the residual core material. The reaction of the core material with the chlorine gas can be based on, for example, the core material, the temperature, pressure, etc. As a result of the reaction, the core material is removed from the part. The part can be infiltrated with a slurry and then melt infiltrated with silicon at a temperature greater than 1410 degrees Celsius. The part can then be machined, including the arrays of cooling holes in fluid communication with the hollows formed by the removed cores. The part can then be coated with an EBC.

The matrix composite structure is not limited to the ceramic fabric and the processes described with respect to the above embodiments. Other matrix composite components and processes are also contemplated herein. For example, the matrix composite component can include a SiC/SiC composite manufactured by a CVI, slurry, and melt infiltration process, a SiC/SiC composite manufactured by a tow coating, tape casting, and lamination process, a SiC/SiC composite manufactured by a CVI, pre-ceramic polymer infiltration and pyrolysis process, an oxide/oxide composite manufactured by a tape casting, lamination, and sintering process, a C/C/SiC composite manufactured by a polymer carbonization, and melt infiltration process, and a C/SiC composite manufactured by a CVI process or a CVI, slurry, and melt infiltration process. Further, the matrix composite component is not limited to ceramic matrix composites and other embodiments are contemplated; the matrix composite can comprise a metal matrix, a ceramic matrix, or hybrid matrix composite.

In an embodiment, chlorine gas can be used for removing a portion of the core from the matrix composite part. Removal of the core can be by any suitable halogen gas. In one form, the halogen gas is used to remove a core comprising a metallic alloy foam.

In an embodiment, the core can include an alloy that is also used in the fabrication of the matrix composite component.

The material of the core can be based on a variety of factors depending on the application. For example, the core should have a sufficiently high melting temperature to withstand initial rigidization processing, but a sufficiently low melting temperature so that the matrix composite retains sufficient properties for the application. Rigidization processes can include for example chemical vapor deposition, physical vapor deposition, pre-ceramic polymer infiltration and pyrolysis, slurry infiltration and melt infiltration, and slurry infiltration and sintering. The core should also be chemically compatible with the composite and composite matrix processing. The core can be an alloy that is used in the manufacturing of the composite, or one that is different.

The above described embodiments employ a core made of Ge55/Si45 and a core made of Al52/Si48. The core is not limited to these materials, and other materials are also contemplated herein. For example, the core can include yttrium, lanthanum, terbium, or ytterbium alloys containing less than 10% silicon. In an embodiment, the core can include zirconium and hafnium alloys including one or more of carbon, boron, nitrogen, oxygen, silicon, hafnium, tantalum, aluminum, and less than 10 atomic % of one or a combination of scandium, yttrium, titanium, vanadium, niobium, chromium, molybdenum, tungsten, cobalt, rhodium, iridium, nickel, germanium, tin, terbium, and ytterbium.

In an embodiment, the core can include boron alloys including one or more of Sn, Zn, Cu, titanium and titanium alloys including one or more of Si, B, Ge, Sn, germaninum alloys including one or more of Si, B, Ti, Mo, Ni, Nb, Zr, Y, V, Co, and aluminum alloys including one or more of B, Si, Ti, Mo, Ni, Nb, Zr, Y, V, Co. Further, the core can comprise pure nickel, or 51 Ge-49 Si alloy, or Ni—Si—Ge alloy.

The core can be incorporated into the matrix composite part during any suitable phase of composite production, for example, during the performing of laminates, during textile processing of three dimensional fibrous structures (performs), or during assembly of individual performs prior to rigidization. The core can be incorporated during assembly of multiple partially rigidized composites; such assembly can include one or more unrigidized preforms. As will be appreciated, the matrix composite component can use any suitable number of cores to achieve a desired component geometry. In one form, the core incorporates registration features that position the core in relationship to other cores, composite structure(s) or other tooling.

The core can be fabricated by any suitable method for the application, for example casting, forging, bending of sheet, bending of wire, machining, grinding, EDM, laser cutting, water jet cutting, electroforming, welding of multiple pieces, brazing of multiple pieces, laser sintering, and/or powdered metal processing.

Various coatings can be applied to the core, for example, to improve compatibility with later processes, to reduce adhesion between the core and the matrix composite, or to simplify assembly. The coating can include one or more of, for example, Si, Si, SiC, C, SiNC, $Si_3N_4$, B, Ir, Mo, Rh, Pd, Pt, Nb or ceramic oxides, nitrides, or borides. The coating can be applied by CVD, PVD, plasma spray, brush, or spray on slurry. The core can be fabricated from a combination of metal alloys. The core can be fabricated as multiple pieces where some pieces, or sections of pieces, of the core have a higher melting point that other pieces, or sections of pieces. In addition, other materials can be cast into or bonded to the core, for example monolithic ceramic, CMC, or carbon. The core can comprise a metallic foam core. The core can include one or more metal elements that survive all processing and remain in the CMC after removal of for example relatively lower temperature material(s). External tooling can be constructed of the same material as the core. The core can comprise a metallic foam core, and the density of the metallic alloy foam can be tailored to achieve a predetermined melt volume infiltration.

In the above described embodiments, core removal is performed by melting the core. Other embodiments are contemplated herein. For example, the matrix composite component can be fabricated to trap the core so that the core or a portion thereof, upon melting, wicks into the matrix composite component and the excess molten material flows out of the matrix composite component. In one form, the core and/or matrix composite component can include one or more features, for example apertures or channels, that allow for escape of molten material upon melting. The matrix composite part can be machined to create a passage for the core. In one embodiment, the core and composite matrix part are heated above vaporization temperature under vacuum to remove one or more elements of the core material. Where the core comprises a coated core, the coating can be removed by dissolving, reacting, or machining, for example, prior to or during core removal. In one form, the core can be removed by grinding, machining, or grit blasting, for example, when access exists. In one form, the core can be chemically removed in a liquid or by a gas phase using, for example, acids, oxygen, or other chemicals.

In an embodiment, the matrix composite component is provided with an aperture formed for example by machining, through which the molten core material escapes when halogen gas is introduced to the core. In one form, halogen gas is used to remove a core comprising a metallic alloy foam.

In an embodiment, core removal is by reaction, for example by melting, occurring on the core surface, within the core, or upon melting of the core. In one form, the core comprises silicon and, upon melting, the silicon reacts with carbon within the composite to form silicon carbide.

Any theory, mechanism of operation, proof, or finding stated herein is meant to further enhance understanding of embodiment of the present invention and is not intended to make the present invention in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiments of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

What is claimed is:

1. A method for making a gas turbine engine matrix composite structure comprising:
    providing at least one metal core element;
    fabricating a matrix composite component about the metal core element; and
    removing at least part of the metal core element from the matrix composite component by introduction of a halogen gas.

2. The method of claim 1 in which the matrix composite is composed of at least one selected from the group consisting of a SiC/SiC composite manufactured by a chemical vapor infiltration (CVI), slurry, and melt infiltration process, a SiC/SiC composite manufactured by a tow coating, tape casting, and lamination process, a SiC/SiC composite manufactured by a CVI, pre-ceramic polymer infiltration and pyrolysis process, an oxide/oxide composite manufactured by a tape casting, lamination, and sintering process, a C/C/SiC composite manufactured by a polymer carbonization, and melt infiltration process, and a C/SiC composite manufactured by a CVI process or a CVI, slurry, and melt infiltration process.

3. The method of claim 1 in which the metal core element is composed of at least one selected from the group consisting of:
    yttrium, lanthanum, terbium, and ytterbium alloys containing less than 10% silicon;
    zirconium and hafnium alloys including one or more of carbon, boron, nitrogen, oxygen, silicon, hafnium, tantalum, aluminum, and less than 10 atomic % of scandium, yttrium, titanium, vanadium, niobium, chromium, molybdenum, tungsten, cobalt, rhodium, iridium, nickel, germanium, tin, terbium, ytterbium;
    boron alloys including one or more of Sn, Zn, Cu, titanium and titanium alloys including one or more of Si, B, Ge, Sn, germanium alloys including one or more of Si, B, Ti, Mo, Ni, Nb, Zr, Y, V, Co, and aluminum alloys including one or more of B, Si, Ti, Mo, Ni, Nb, Zr, Y, V, Co;
    pure nickel, 51 Ge-49 Si alloy, and Ni—Si—Ge alloy.

4. The method of claim 1 in which the metal core element is fabricated by at least one of casting, forging, bending of sheet, bending of wire, machining, grinding, electrical discharge machining (EDM), laser cutting, water jet cutting, electroforming, welding of multiple pieces, brazing of multiple pieces, laser sintering, and powdered metal processing.

5. The method of claim 1 further comprising casting into the metal core element a material selected from the group consisting of: monolithic ceramic, ceramic matrix composite (CMC), and carbon.

6. The method of claim 1 in which the metal core element includes a plurality of pieces and at least two pieces have a different melting point.

7. The method of claim 1 further comprising bonding to the metal core element an element made of a material that is selected from the group consisting of monolithic ceramic, ceramic matrix composite (CMC), and carbon.

8. A method for making a gas turbine engine matrix composite turbine blade, comprising:
    forming a metallic alloy core;
    wrapping a plurality of ceramic fabric plies about the metallic alloy core to have substantially a turbine blade shape and to define an opening in the plurality of ceramic fabric plies that exposes at least a portion of the metallic alloy core to the outside of the plurality of ceramic fabric plies; and
    heating the metallic alloy core and introducing a halogen gas to the metallic alloy core to remove at least a portion of the metallic alloy core through the opening in the plurality of ceramic fabric plies.

9. The method of claim 8 in which wrapping comprises extending one or more of the plurality of ceramic fabric plies beyond the metallic alloy core in a span direction of the turbine blade on both sides of the turbine blade.

10. The method of claim 8 in which the wrapping comprises shaping an upper portion of the plurality of ceramic fabric plies as a solid portion of the turbine blade.

11. The method of claim 8 in which the wrapping comprises integrating a lower portion of the plurality of the ceramic fabric plies with additional ceramic fabric plies to form a turbine blade platform.

12. The method of claim 11 in which forming the metallic alloy core comprises forming an extension in the lower portion of the plurality of the ceramic fabric plies that extends through the turbine blade platform of the turbine blade.

13. The method of claim 8 in which the halogen gas comprises chlorine gas.

14. The method of claim 8 in which the metallic alloy core comprises a metallic alloy foam.

15. The method of claim 8 in which the metallic alloy core comprises an alloy that is also used in the fabrication of the plurality of ceramic fabric plies.

16. The method of claim 8 further comprising coating the metallic alloy core with at least one of Si, Si, SiC, C, SiNC, $Si_3N_4$, B, Ir, Mo, Rh, Pd, Pt, Nb or ceramic oxides, nitrides, or borides.

17. The method of claim 16 in which the coating is applied by chemical vapor deposition (CVD), physical vapor deposition (PVD), plasma spray, brush or spray on slurry.

18. A method for making a gas turbine engine composite component, the method comprising:
   forming a metal casting during which a carbon release film thereon is converted to SiC;
   applying a layer of carbon to the metal casting;
   wrapping the metal casting in a plurality of fabric layers to have substantially a gas turbine engine component shape;
   infiltrating the wrapped metal casting with SiC chemical vapor infiltration; and
   heating the wrapped metal casting and introducing a halogen gas to the metal casting to remove at least a portion of the metal casting.

19. The method of claim 18 in which forming the metallic alloy core comprises using chopped fiber with binder in branched areas of the metallic alloy core.

* * * * *